UNITED STATES PATENT OFFICE.

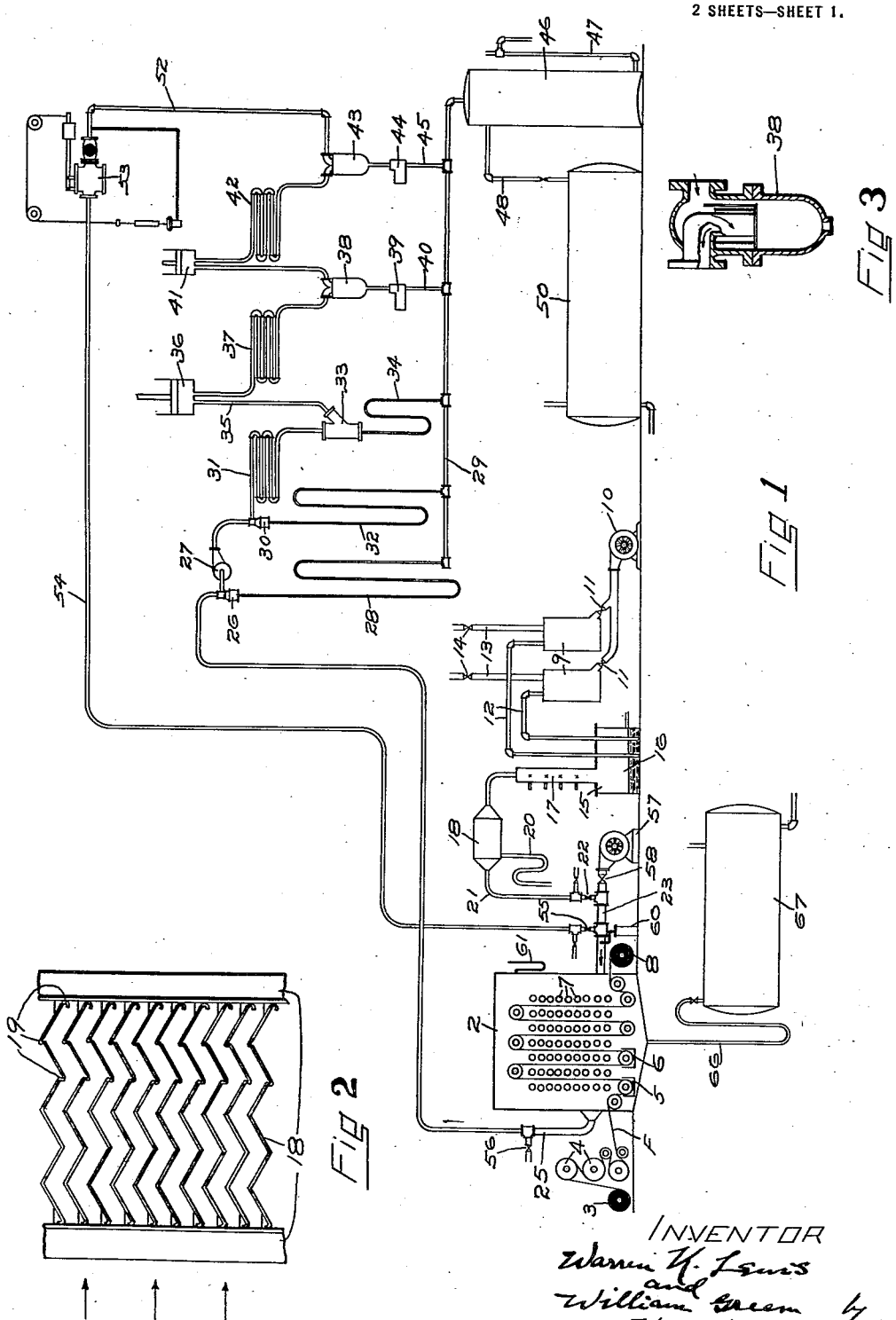

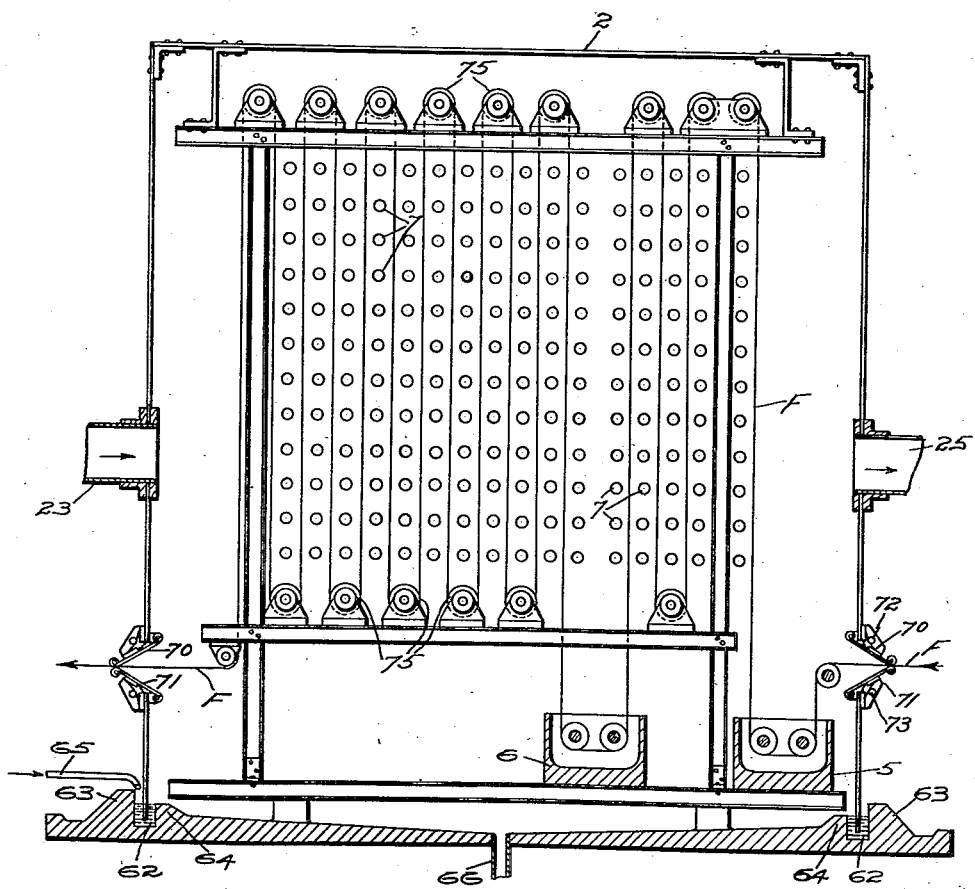

WARREN K. LEWIS AND WILLIAM GREEN, OF NEWTON, MASSACHUSETTS.

SOLVENT-RECOVERY APPARATUS.

1,371,914.             Specification of Letters Patent.      Patented Mar. 15, 1921.

Application filed May 8, 1919. Serial No. 295,647.

*To all whom it may concern:*

Be it known that we, WARREN K. LEWIS and WILLIAM GREEN, citizens of the United States, residing at Newton, in the county of Middlesex and State of Massachusetts, have invented certain Improvements in Solvent-Recovery Apparatus, of which the following description, in connection with the accompanying drawings, is a specification, like reference characters on the drawings indicating like parts in the several figures.

This invention relates to apparatus for drying materials coated or impregnated with compounds carrying a volatile inflammable solvent, or materials otherwise treated with such solvents, and is especially concerned with the recovery of the solvent used.

It is the chief object of the invention to devise an apparatus with which the process disclosed in our prior application, Serial No. 258,521, filed October 17, 1918, for distillation processes, can be efficiently practised.

The solvent recovery processes of this general character proposed prior to our invention disclosed in the application just described, have, as stated more fully in said application proved unsuccessful commercially where the solvents dealt with are volatile and inflammable due to the fact that the attempt to recover the solvents greatly increased the danger of fire and explosion which always exists in the handling of solvents of this character. Applicants' process has completely overcome this objection by performing the drying and recovering operations in an atmosphere of inert gas; that is, a gas in which the solvent does not burn. In carrying out this process it is usually preferable from the standpoint of economy to use flue gas as the inert gas, and one of the chief features of the present invention consists in a novel organization of apparatus designed for the practice of this process under conditions in which it is desirable to use flue gas.

The invention also includes novel means for excluding air from the inclosure within which the drying operation is performed, consisting particularly in a novel liquid seal and unique means for substantially preventing the entrance of air into the drying chamber at the points where the material to be dried enters and leaves the chamber.

An important commercial application of this invention is in the drying of rubberized fabrics, that is, fabrics which have been coated or impregnated with a rubber compound dissolved in a solvent. These fabrics according to a common practice are supported during the drying operation on a series of rolls and a great deal of trouble is experienced in practice with the sticking of the rubber coating or compound to the rolls. That is, coatings of the rubber compound gradually build up on the rolls to such a point that they can no longer guide the fabric in the proper path and sometimes this accumulation seriously interferes with the driving of the rolls which is necessary to transfer the material through the drying chamber. It is exceedingly difficult to clean off this accumulation of coating material, and one of the objects of this invention is to devise a roll which will substantially reduce the trouble heretofore experienced from this cause.

The various features of the invention will be readily understood from the following description when read in connection with the accompanying drawings and will be pointed out more particularly in the appended claims.

Referring now to the drawings,

Figure 1 is a diagrammatic view showing a drying and solvent recovery system embodying the present invention;

Fig. 2 is a plan view of the moisture eliminator used in the system shown in Fig. 1;

Fig. 3 is a cross sectional view of a separator which may conveniently be used in said system;

Fig. 4 is a vertical cross sectional view of the drying apparatus; and

Fig. 5 is a longitudinal sectional view of one of the rolls on which the material to be dried is supported.

The drawings show a system designed particularly for use in drying rubberized fabrics, artificial leather and the like. This system comprises a drying inclosure, or chamber, 2, having upper and lower sets of rolls, by means of which the web of fabric to be dried is supported in a zigzag path and is transferred through the drying chamber. Assuming, for instance, that the material to be treated is tire fabric, which is to be impregnated with a rubber compound dissolved in gasolene, naphtha, benzol, or the like, the web leading from the untreated roll 3 of fabric is run over a series of drying rolls 4, then led into the drying chamber 2, where it passes through two dip tanks 5 and 6 containing the solutions with which the fabric is to be impregnated, passing over the rolls previously mentioned and between the rows of steam pipes 7, and finally is led out of the chamber and wound up at 8.

As above indicated, the drying of the material is carried on in an atmosphere of flue gas. The source of this flue gas consists of two stoves, or burners, 9, designed to burn any suitable kind of fuel, such as coal, coke, charcoal, wood, oil, illuminating gas or the like, the chief function of these burners being to remove the free oxygen from the air passing through them. A blower 10 forces air into the burners 9 through dampers 11, and the gaseous products of combustion, together with the gaseous elements not acted upon in the burners, may pass out of the burners either through pipes 12 or through chimneys 13. Normally, however, the chimneys are closed by dampers 14 so that the flue gas flows through the pipes 12 into a scrubbing or cleaning apparatus 15 which removes the dirt and soot from the gas. For this purpose the lower ends of the pipes 12 are submerged in water in the tank 16 so that the flue gas bubbles up through this water. It is then led through a series of water sprays 17 which wash out the remaining soot and smoke. The current or gas here picks up considerable moisture which should be removed before the gas enters the drying chamber 2, and for this purpose the gas is forced through an eliminator 18 which mechanically removes the greater part of the entrained moisture. Any suitable type of apparatus may be used for this purpose, but the form of eliminator shown in Fig. 2 is well suited to this purpose. As shown in this figure, the gas enters in the direction indicated by the arrows, passing through a series of parallel corrugated partitions, or deflectors, which compel the gas, which may or may not be passed through a curtain of water spray as it enters the eliminator to travel in a zigzag path and the entrained particles of liquid are caught by the small lips or projections 19 which conduct the liquid to the lower part of the casing where it is led away through the waste pipe 20.

The flue gas is next led through a pipe 21, valve 22, and pipe 23 into the casing or drying chamber 2, entering this chamber close to the point at which the dried fabric emerges so that the gas first comes in contact with material which is nearly or entirely dry. The gas flows through the drying chamber, taking up from the fabric the vapors of the solvent in which the coating is dissolved, the evaporation of this solvent, of course, being expedited by the heat from the steam pipes 7 and the resulting mixture of flue gas and solvent vapors is carried away from the drying chamber through the pipe 25.

This pipe 25 leads to a cooling and compressing system which condenses the vapors of the solvent and thus separates the solvent from the flue gas. In the arrangement shown the pipe 25 leads to a separator 26 consisting simply of a T having one end enlarged, the side outlet from the T leading to a driven pump or blower 27, the chief function of which is to assist in maintaining a substantially uniform pressure in the drying chamber. The sharp turn in the flow of gas caused by its passage through the separator 26 tends to throw any entrained particles of liquid out of the gas current and the liquid so separated from the gas drains into a pipe 28 which is bent to form a trap and leads the recovered solvent to a main pipe line 29.

The blower or pump 27 forces the mixture of flue gas and solvent vapors through another separator 30 into a cooler or condenser 31, which may be designated as the "forecooler." A pipe 32, similar to the pipe 28, leads from the separator 30 to the main 29. A considerable part of the solvent vapor will be condensed in the forecooler 31. The fluids flow from the forecooler into a separator 33 and the liquid passing through the separator is led through the pipe 34 to the main 29. The remaining mixture of gas and vapor is conducted through a pipe 35 to the first stage compressor 36 which forces it into a second condenser or cooler 37, hereinafter referred to as the "intercooler." From this cooler fluids may be led to another separator 38 preferably of a more elaborate nature than those used in the parts of the system so far described and consisting, for instance, of the construction illustrated in Fig. 3, this being a well known commercial form of separator. The liquid collecting in this separator is led through a pressure trap 39 and a pipe 40 to the main 29.

The greater part of the solvent has by this time been condensed and separated from the flue gas and the remaining mixture of solvent vapors and flue gas next passes through a second stage compressor 41 in which the mixture is compressed to a smaller volume and a condenser 42 to a separator 43 similar to the separator 38, the condensed solvent flowing from the separator 43 into a pressure trap 44 and thence through a pipe 45 to the main 29. The main 29 discharges into a separator tank 46 of a well known type much used to separate mixtures of gasolene and water, the water outlet for this tank being indicated at 47 and the gasolene or solvent outlet at 48. The latter outlet leads into a sump 50.

This apparatus is designed to recover all but a very small percentage of the solvent used in treating the fabric. The flue gas may be discharged into the atmosphere through a pressure relief valve but we prefer to return this gas to the drying chamber again for reuse. This practice is preferred both because the flue gas still contains a very small percentage of solvent so that the re-circulation of the gas thus raises somewhat the efficiency of the system, and also for the reason that this gas has already been cleaned and the re-circulation of it therefore necessitates supplying merely enough new gas to compensate for leakage. This reduces the capacity of the burners required, in case special burners are used for this purpose, and also reduces the capacity of the washing or scrubbing apparatus required.

The return circuit for the gas separated from the solvent includes a pipe 52 leading from the separator 43 to an automatic valve 53 and a pipe 54 leading from the valve 53 to the pipe 23. The valve 53 is a pressure reducing valve and is automatically controlled by variations in pressure on the high pressure side of the valve. It preferably consists of a valve of the balance type equipped with any one of several types of automatic mechanisms of a character well known to those skilled in the automatic valve art. The pressure usually operates through a diaphragm to move the valve in one direction against the action of springs or weights, or a combination of springs and weights, so that when the pressure on the high pressure side of the valve builds up above a predetermined point the valve will automatically open and allow a certain amount of the gas to escape from the pipe 52 into the pipe 54. If, however, the pressure falls in the pipe 52 below a predetermined point, the valve will be automatically closed by the weights or springs employed and thus allow the pressure in the pipe 52 to build up to the predetermined point for which the valve is set. The valve thus coöperates with the compressor 41 to maintain the desired pressure in the condenser 42 and also automatically permits the escape of gas into the return pipe 54 when the pressure exceeds a predetermined value.

The operation of this system has been above described so completely in connection with the description of the construction of the system that any further description of operation is believed to be unnecessary.

Whenever it is desired to make repairs inside the drying chamber, or to enter this chamber for any other purpose, the blower 10 may be shut down, or the dampers 14 may be opened and the valve 22 closed, either of these operations serving to shut off the supply of new flue gas. The blower 27 and the two stage compressors 36 and 41 are shut down. The valve 55 in the pipe line 54 is then closed, and the valve 56 leading from a T in the pipe line 25 is opened. A blower 57 connected with the pipe 23 through a valve 58 is next set in operation and the valve 58 is opened. This blower forces air through the drying chamber and out of the valve 56 and it is kept in operation until the drying chamber is swept substantially clean of flue gases. The workman may then enter the chamber without any fear of ill effects and make the repairs or changes necessary. After the repairs are completed the blower 57 is shut down and the valve 58 is closed. The valve 22 may then be opened, the dampers 14 closed, the blower 10 started up and flue gas forced into the drying chamber and out through the valve 56 until the air in the drying chamber is displaced by the flue gas. The valve 56 may then be closed and the normal operation of the system may be resumed.

It obviously is desirable to be able to detect readily substantial changes in the composition of the current of gas entering the drying chamber and it is especially desirable to know the percentage of oxygen in this gas mixture. It is difficult to determine the oxygen content directly but it can be determined indirectly, and for this purpose a carbon dioxid testing apparatus 60 is connected into the pipe 23 at a point close to its delivery end. Preferably a continuous $CO_2$ indicator is employed for this purpose. This apparatus indicates automatically the percentage of $CO_2$ in the current of gas flowing through the pipe 23. Inasmuch as the percentage of $CO_2$ that should exist in the current of flue gas if all the oxygen in the air were converted into $CO_2$ is known, it can readily be determined by reading the instrument whether or not the oxygen content is within safe limits. Ten or twelve per cent. of oxygen in the flue gas is not objectionable since this percentage is too small to introduce any danger of explosion or fire. Usually, however, the percentage of oxygen is much lower since with this type of apparatus it is very easy to maintain a low free oxygen content in the gases.

A simple U-gage 61, attached to the drying chamber, indicates the gas pressure in the drying chamber.

The use of flue gas in direct contact with the material to be dried, for the removal of moisture is well known. Under such conditions it is used primarily as a heating agent. For this purpose it must enter the drier substantially uncooled and give up its sensible heat to the material to be dried. Further, such flue gas always carries large quantities of moisture formed from the combined oxygen and the hydrogen of the fuel. The use of flue gas coming directly from the fire for the drying of solvents other than water is entirely impractical, because first, the initial temperature of the flue gas is so high that it will almost without exception injure the material to be dried, second, the flue gas upon cooling condenses moisture even at a relatively high temperature, owing to the large amount of moisture carried from the hydrogen content of the fuel, and third, the sulfur and other impurities in the flue gas are liable to injure the product being dried and also the parts of the drying apparatus.

For example, in the drying of rubberized fabric after the coating of such fabric with rubber solutions in organic solvents, the fabric must at no time be heated above approximately 160° F. Flue gases, as used in ordinary drying practice, are from 1000° F. up in temperature. Further, the fabric to be impregnated must be free from water and the fabric entering the drier is usually dried and run into the impregnating equipment while still hot so as to have the smallest possible moisture content. The condensation of moisture upon the fabric such as would ensue from the use of flue gas direct, owing to its high water vapor content, would injure the fabric. Furthermore, the sulfur gases and dust in the flue gases would rot the fabric, due to the action of acid on cellulose fiber, and soil it with flue dust. It would also injure the drying apparatus in time. It is, therefore, essential when flue gases are used in such drying operations to use cool and clean gases. This means that the sensible heat of these flue gases must be practically wasted and their use in commercial practice has hitherto been considered out of the question on this account. On the other hand, we have demonstrated that the expense and economic waste of heat involved in the cooling and purification of these gases is justified because of the protection which their subsequent use affords against fire and explosion.

As above stated, one of the features of this invention consists in novel means for preventing the entrance of the outside atmosphere into the drying chamber or the undue escape of flue gas out of the chamber. For this purpose great pains is taken in building the casing 2 to make the joints tight, and the lower edge of the casing extends into a liquid seal 62, Fig. 4. For convenience in installing the apparatus the floor may be made of concrete and designed, as clearly shown in Fig. 4, to provide a groove to receive the edge of the casing and contain the water that forms the seal. This groove has a high outer wall 63 and a lower wall 64 inside the inclosure. Water is constantly supplied to the groove through the pipe 65 and this water flows under the edge of the casing and overflows the inner wall 64, running down the inclined floor to a central discharge pipe 66, Figs. 1 and 4. This pipe is bent to form a trap and discharges into a sump 67. The mixture of gasolene and water collected in this sump may be run through a separator tank to separate the two liquids. This arrangement provides a simple economical seal which is constantly discharging within the tank and thus prevents the collection of liquid gasolene or other solvent in the seal at points outside of the casing.

The guiding of the fabric into and out of the drying chamber by some means that prevents any considerable escape of the flue gas from the chamber, or the entrance of air into it, presents a problem which has been effectually solved by the arrangement illustrated in Fig. 4. The fabric F travels in a direction indicated by the arrows and enters the casing through a pair of shutters 70 and 71. Each of these shutters is pivoted to the casing and the joint between the shutter and the casing is covered by flexible sheet material such, for instance, as canvas or leather, the edges of this material being secured under plates bolted or riveted to the shutters and to the adjacent wall of the casing. The edges of the shutters that bear on the fabric are rolled outwardly, as clearly shown in the drawings, and press on the fabric opposite each other, this pressure being maintained through torsion springs 72 and 73, respectively. The same construction is employed at the opposite side of the casing where the dried and coated fabric emerges.

It is obvious that while no substantial damage would be done by the slight leakage of flue gas out of the chamber, still any material leakage would reduce the efficiency of the system, and it obviously is desirable to prevent the entrance of the atmosphere into the chamber since this would add to the oxygen content which should be kept as low as possible.

The web of fabric F is transferred through the casing by driving one or both of the sets of rolls 75 which support the fabric. These rolls, as above stated, become coated with an accumulation of the material with which the fabric is coated or impregnated, and it is necessary to remove this accumulation from the rolls from time to time in order to enable the rolls to guide the fabric in the proper path. That is, if the rolls become coated with too great an accumulation of the coating compound the result is to move the fabric out of its normal path and close to, or even against, certain of the steam pipes 7. Furthermore, this accumulation may build up on the rolls to such an extent as to interfere with the driving of the rolls. As above stated, it is a very difficult matter to remove this accumulation from the rolls of the character heretofore employed. After an extensive investigation we have discovered that by using a metal roll, made for instance of iron, and coated with a vitreous enamel, such as that used in coating bath-tubs, enamel ware and the like, the difficulty heretofore experienced from the cause just described is reduced very materially. The coating does not accumulate on the rolls as rapidly and it is removed far more easily. In Fig. 5, 75 indicates the metal body of a roll and 76 the enamel coating.

While we have herein shown and described the best embodiment of our invention of which we are at present aware, it is obvious that this embodiment may be modified in many particulars without departing from the spirit or scope of this invention. It will also be understood that while we have disclosed the invention as embodied in a system designed particularly for the treatment of rubberized fabric, the invention is not limited in its application to the treatment of this specific material.

What is claimed as new, is:

1. An apparatus for drying a material carrying a volatile inflammable solvent and for recovering said solvent, comprising, in combination, a drying chamber, means for supporting the material to be dried in said chamber, a burner, means for conducting flue gas from said burner into said chamber whereby said gas will take up the vapors of said solvent from said material, means for cleaning the flue gas during its travel to said chamber, and means for recovering the vaporized solvent carried by the gas leaving the drying chamber.

2. An apparatus for drying a material carrying a volatile inflammable solvent and for recovering said solvent, comprising, in combination, a drying chamber, means for supporting the material to be dried in said chamber, a burner, means for conducting flue gas from said burner into said chamber whereby said gas will take up the vapors of said solvent from said material, means for substantially cooling the gas during its travel to said chamber, and means for recovering the vaporized solvent carried by the gas leaving the drying chamber.

3. An apparatus for drying a material carrying a volatile inflammable solvent and for recovering said solvent, comprising, in combination, a drying chamber, means for supporting the material to be dried in said chamber, a burner, means for conducting flue gas from said burner into said chamber whereby said gas will take up the vapors of said solvent from said material, means for substantially cooling said gas during its travel to said chamber, means in said drying chamber for heating said gas, and means for recovering the vaporized solvent carried by the gas leaving the drying chamber.

4. An apparatus for drying a material carrying a volatile inflammable solvent and for recovering said solvent, comprising, in combination, a drying chamber, means for supporting the material to be dried in said chamber, a burner, means for conducting flue gas from said burner into said chamber whereby said gas will take up the vapors of said solvent from said material, a gas washing apparatus through which the gas passes on its way to said chamber, means between said washing apparatus and said drying chamber for removing the entrained moisture from the gas before it is delivered to said chamber, and means for recovering the vaporized solvent carried by the gas leaving the drying chamber.

5. An apparatus for drying a material carrying a volatile inflammable solvent and for recovering said solvent, comprising, in combination, a drying chamber, means for supporting the material to be dried in said chamber, a combustion chamber, means for conducting the gaseous products of combustion from said combustion chamber to said drying chamber whereby said gaseous products will take up the vapors of said solvent from said material, means for cleaning and cooling said gaseous products during their travel from said combustion chamber to said drying chamber, and means for recovering the vaporized solvent taken up from said material by said gaseous products.

6. An apparatus for drying a material carrying a volatile inflammable solvent and for recovering said solvent, comprising, in combination, a drying chamber, means for supporting the material to be dried in said chamber, a burner, means for conducting flue gas from said burner into said chamber whereby said gas will take up the vapors of said solvent from said material, additional means for conducting the mixture of gas and solvent vapors away from said chamber and condensing said solvent to separate it from said gas and means for returning the flue gas after its separation from said solvent to said drying chamber.

7. An apparatus for drying a material carrying a volatile inflammable solvent and for recovering said solvent, comprising, in combination, a drying chamber, means for supporting the material to be dried in said chamber, a burner, means for conducting flue gas from said burner into said chamber whereby said gas will take up the vapors of said solvent from said material, means for cooling and compressing the resulting mixture of said gas and solvent vapors to condense said vapors and separate the solvent from said gas, means for conducting the gas so separated from the solvent back to said drying chamber to be re-used, and a pressure reducing valve controlling the return flow of said gas to said drying chamber, said valve being automatically responsive to variations in the pressure on the high pressure side of the valve.

8. An apparatus for drying a web of sheet material carrying a coating containing a volatile inflammable solvent and for recovering said solvent, comprising, in combination, a casing forming a drying chamber, means for supporting said material in a zigzag path in said chamber, means for heating said material, a burner, means for conducting flue gas from said burner into said chamber whereby said gas will take up the vapors of said solvent from said material, additional means for conducting the resulting mixture of said gas and solvent vapors away from said chamber and for cooling and compressing said mixture to condense said vapors and thereby separate the solvent from the gas.

9. An apparatus for drying a material carrying a volatile inflammable solvent and for recovering said solvent, comprising, in combination, a drying chamber, means for supporting the material to be dried in said chamber, a burner, means for conducting flue gas from said burner into said chamber whereby said gas will take up the vapors of said solvent from said material, means for condensing the vapors of said solvent to separate the solvent from said gas, means for returning the flue gas after its separation from said solvent to said chamber to be re-used, a supplemental blower for blowing air through said chamber, and means for controlling the flow of air to said chamber from said supplemental blower.

10. An apparatus for drying a material carrying a volatile inflammable solvent and for recovering said solvent, comprising, in combination, a drying chamber, means for supporting the material to be dried in said chamber, a burner, means for conducting flue gas from said burner into said chamber, means for substantially cooling the gas during its travel to said chamber, means in said chamber for heating said gas and the material to be dried whereby said gas will take up the vapors of said solvent from said material, and additional means for conducting the resulting mixture of flue gas and solvent vapors away from said chamber and condensing said solvent to separate it from said gas.

11. An apparatus for drying a web of sheet material comprising a casing forming a drying chamber, a series of rolls mounted in said chamber to support said web of material in a zigzag path and to transfer it through said chamber, certain at least of said rolls which come in contact with the undried fabric having a vitreous surface.

12. A drying apparatus of the character described, comprising means for supporting the material to be dried, a casing inclosing said means, and a liquid seal in which the lower edge of said casing rests, said seal comprising a support provided with a groove having a wall inside the chamber and a higher wall outside the chamber with means for supplying liquid constantly to said groove from a point outside the chamber, whereby the seal overflows within the chamber, and means for conducting the overflowing liquid away from said chamber.

In testimony whereof we have signed our names to this specification.

WARREN K. LEWIS.
WILLIAM GREEN.